(12) United States Patent
Adachi et al.

(10) Patent No.: US 9,240,201 B2
(45) Date of Patent: Jan. 19, 2016

(54) ENLARGED SUBSTRATE FOR MAGNETIC RECORDING MEDIUM

(71) Applicant: Seagate Technology LLC, Cupertino, CA (US)

(72) Inventors: Koji Adachi, San Jose, CA (US); Ian J. Beresford, Milpitas, CA (US); Thomas Y. Chang, Menlo Park, CA (US); Kuo Hsing Hwang, San Jose, CA (US); James Hennessy, Campbell, CA (US); David Perez, Palo Alto, CA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/834,101

(22) Filed: Aug. 24, 2015

(65) Prior Publication Data
US 2015/0364149 A1 Dec. 17, 2015

Related U.S. Application Data

(63) Continuation of application No. 14/552,189, filed on Nov. 24, 2014, now Pat. No. 9,147,421, which is a continuation of application No. 14/044,621, filed on Oct. 2, 2013, now Pat. No. 8,896,964.

(60) Provisional application No. 61/824,271, filed on May 16, 2013.

(51) Int. Cl.
*G11B 5/39* (2006.01)

(52) U.S. Cl.
CPC .......................................... *G11B 5/39* (2013.01)

(58) Field of Classification Search
CPC .. G11B 25/043; G11B 17/32; G11B 19/2009; G11B 33/121; G11B 33/08; G11B 5/4886; G11B 23/0332
USPC ........................................................ 360/99.01
See application file for complete search history.

(56) References Cited

U.S. PATENT DOCUMENTS

| | | | |
|---|---|---|---|
| 4,568,988 A | 2/1986 | McGinlay et al. |
| 4,712,146 A | 12/1987 | Moon et al. |
| 4,965,684 A | 10/1990 | Stefansky |
| 5,005,089 A | 4/1991 | Thanos et al. |
| 5,025,335 A | 6/1991 | Stefansky |
| 5,025,336 A | 6/1991 | Morehouse et al. |

(Continued)

FOREIGN PATENT DOCUMENTS

| | | |
|---|---|---|
| EP | 1033351 B1 | 6/2004 |
| EP | 1851002 B1 | 10/2011 |

(Continued)

*Primary Examiner* — Mark Blouin
(74) *Attorney, Agent, or Firm* — Hall Estill Attorneys at Law

(57) ABSTRACT

An enlarged substrate for a magnetic recording medium used in a data storage device such as a hard disc drive (HDD). In some embodiments, an apparatus includes a substrate for a magnetic recording disc for installation in a 3½ inch form factor hard disc drive, the substrate having an overall diameter of nominally from 96.9 mm to 100.4 mm. In other embodiments, an apparatus comprises a substrate for a magnetic recording disc for installation in a 2½ inch form factor hard disc drive, the substrate having an overall diameter of nominally from 66.9 mm to 71.8 mm. In other embodiments, a data storage device has a magnetic recording medium that uses an enlarged substrate as set forth above.

20 Claims, 7 Drawing Sheets

(56) References Cited

U.S. PATENT DOCUMENTS

| | | | |
|---|---|---|---|
| 5,366,542 A | 11/1994 | Yamada et al. | |
| 6,280,294 B1 | 8/2001 | Miyamoto | |
| 6,490,123 B1 * | 12/2002 | Okunaga | G11B 25/043 360/99.15 |
| 6,583,029 B2 | 6/2003 | Abe et al. | |
| 6,595,028 B1 | 7/2003 | Miyamoto et al. | |
| 6,645,051 B2 | 11/2003 | Sugiyama et al. | |
| 6,751,050 B1 | 6/2004 | Tokuyama et al. | |
| 6,900,962 B1 | 5/2005 | Forbord | |
| 7,163,110 B2 | 1/2007 | Huang et al. | |
| 7,180,709 B2 | 2/2007 | Kim et al. | |
| 7,246,708 B2 | 7/2007 | Chuang et al. | |
| 7,312,949 B2 | 12/2007 | Chee et al. | |
| 7,588,842 B1 * | 9/2009 | Abarra | G11B 5/66 428/828.1 |
| 7,748,532 B2 | 7/2010 | Buitron et al. | |
| 7,795,114 B2 | 9/2010 | Moriwaka | |
| 8,092,280 B2 | 1/2012 | Ishida et al. | |
| 8,241,768 B2 | 8/2012 | Takizawa et al. | |
| 8,277,286 B2 | 10/2012 | Hung et al. | |
| 8,330,245 B2 | 12/2012 | Pitney et al. | |
| 8,339,732 B2 | 12/2012 | Juang et al. | |
| 8,372,298 B2 | 2/2013 | Haberecht | |
| 8,376,811 B2 | 2/2013 | Schwandner | |
| 2001/0049031 A1 | 12/2001 | Bajorek et al. | |
| 2008/0193801 A1 | 8/2008 | Haneda et al. | |
| 2008/0318493 A1 | 12/2008 | Aida | |
| 2009/0136786 A1 | 5/2009 | Aida et al. | |
| 2012/0248578 A1 | 10/2012 | Masuda | |
| 2012/0251760 A1 | 10/2012 | Ishida et al. | |
| 2012/0273715 A1 | 11/2012 | Palanisamy Chinnathambi et al. | |
| 2012/0300329 A1 | 11/2012 | Benhase et al. | |
| 2012/0300336 A1 | 11/2012 | Benhase et al. | |
| 2013/0032571 A1 | 2/2013 | Doi et al. | |
| 2013/0032573 A1 | 2/2013 | Ogata et al. | |

FOREIGN PATENT DOCUMENTS

| | | |
|---|---|---|
| EP | 1808887 B1 | 11/2011 |
| EP | 2194568 B1 | 5/2012 |
| WO | 01/23485 A1 | 4/2001 |
| WO | 2006/013996 A1 | 2/2006 |
| WO | 2006/090574 A1 | 8/2006 |

* cited by examiner

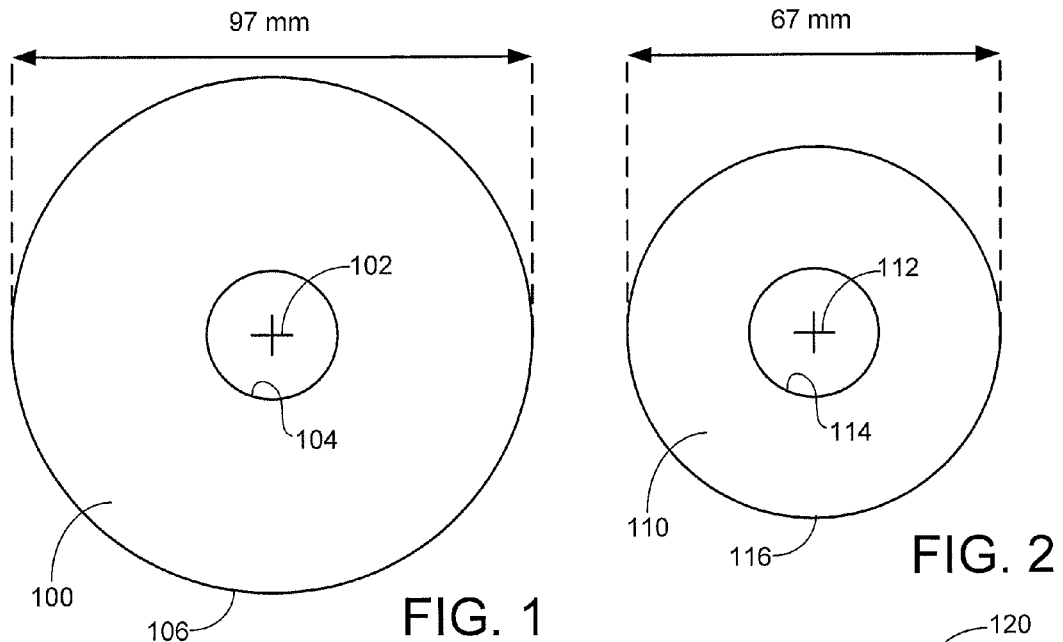
FIG. 1
FIG. 2
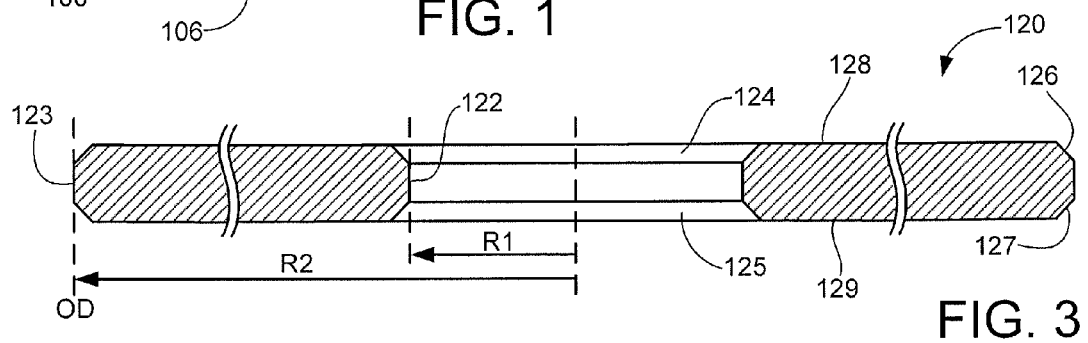
FIG. 3
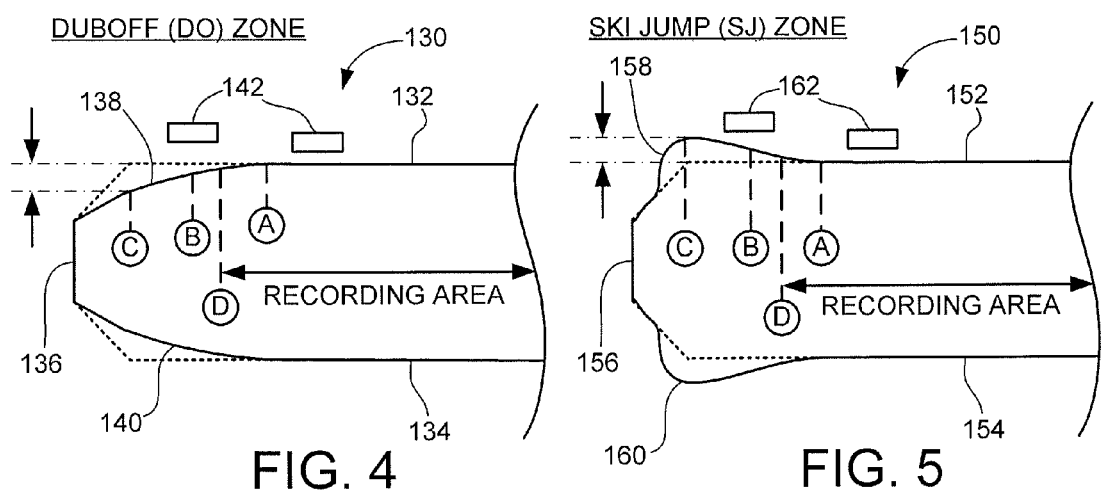
FIG. 4
FIG. 5

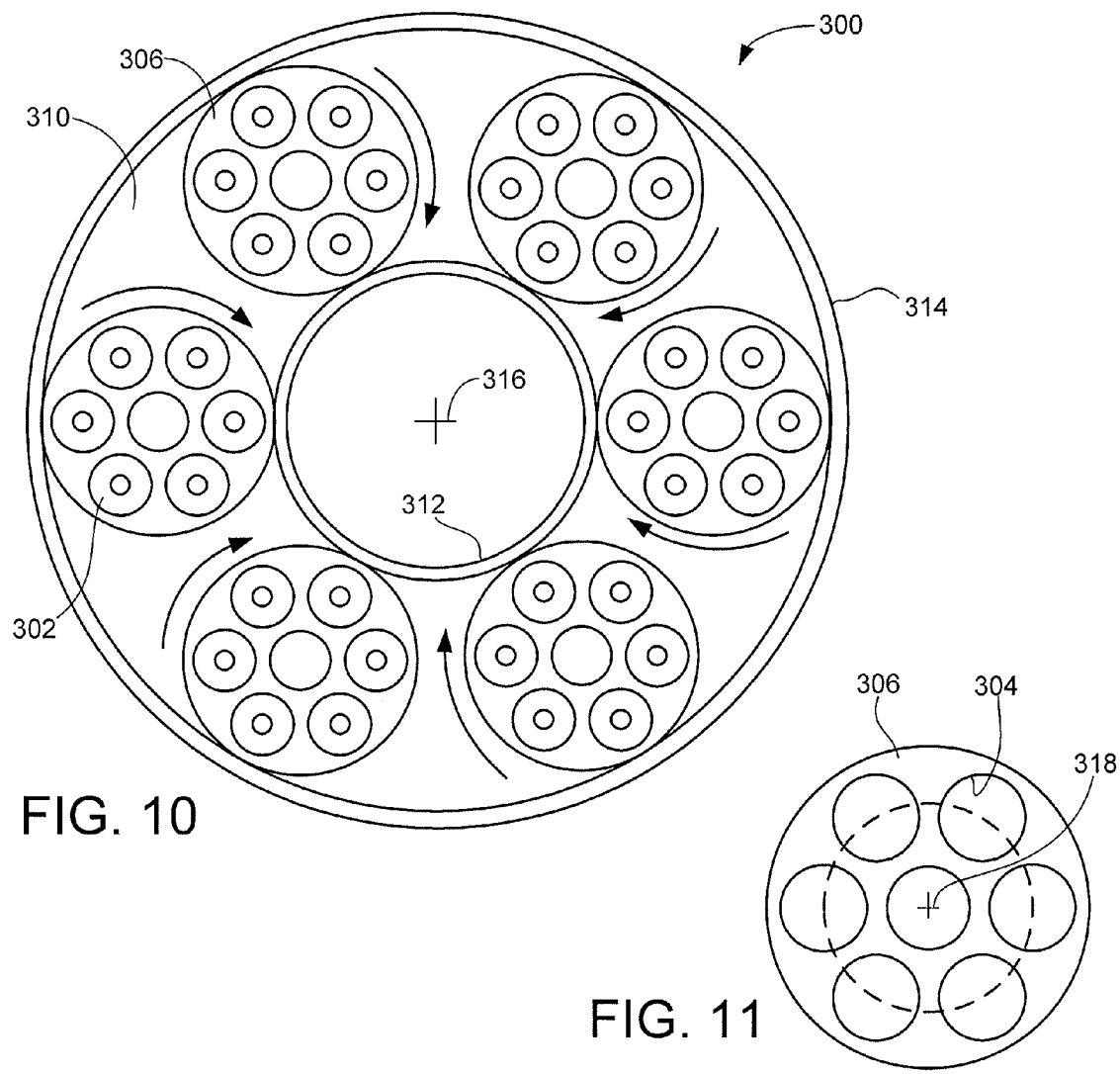
FIG. 10
FIG. 11
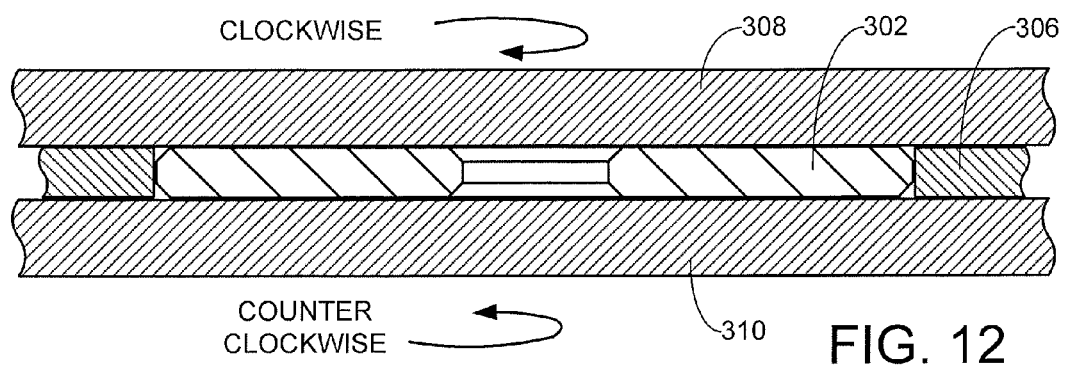
FIG. 12

ENLARGED SUBSTRATE FOR MAGNETIC RECORDING MEDIUM

RELATED APPLICATIONS

The present application is a continuation of U.S. patent application Ser. No. 14/552,189 filed Nov. 24, 2014 which is a continuation of U.S. Pat. No. 8,896,964 issued on Nov. 25, 2014 (formerly Ser. No. 14/044,621 filed Oct. 2, 2013) which makes a claim of domestic priority under 35 U.S.C. §119(e) to U.S. Provisional Application No. 61/824,271 filed May 16, 2013, the contents of which are incorporated by reference.

SUMMARY

Various embodiments of the present disclosure are generally directed to an enlarged substrate for a magnetic recording medium used in a data storage device such as a hard disc drive (HDD).

In some embodiments, an apparatus includes a substrate for a magnetic recording disc for installation in a 3½ inch form factor hard disc drive, the substrate having an overall diameter of nominally from 96.9 mm to 100.4 mm. In other embodiments, an apparatus comprises a substrate for a magnetic recording disc for installation in a 2½ inch form factor hard disc drive, the substrate having an overall diameter of nominally from 66.9 mm to 71.8 mm. In other embodiments, a data storage device has a magnetic recording medium that uses an enlarged substrate as set forth above.

These and other features of various embodiments can be understood from a review of the following detailed description in conjunction with the accompanying drawings.

BRIEF DESCRIPTION OF THE DRAWINGS

FIG. 1 is an enlarged substrate for use in a 3½ inch form factor hard disc drive (HDD) in accordance with some embodiments.

FIG. 2 is an enlarged substrate for use in a 2½ inch form factor HDD in accordance with some embodiments.

FIG. 3 is a cross-sectional, elevational view of another enlarged substrate that may correspond to the substrates of FIGS. 1-2.

FIG. 4 is an end view of another enlarged substrate with a duboff (DO) zone.

FIG. 5 is an end view of another enlarged substrate with a ski jump (SJ) zone.

FIG. 10 is a top plan view of a polishing assembly adapted to polish enlarged substrates as in FIGS. 1-9 in accordance with some embodiments.

FIG. 11 illustrates a carrier used in FIG. 10.

FIG. 12 is a cross-sectional, elevational view of the polishing system in FIG. 10.

DETAILED DESCRIPTION

Figure 6:
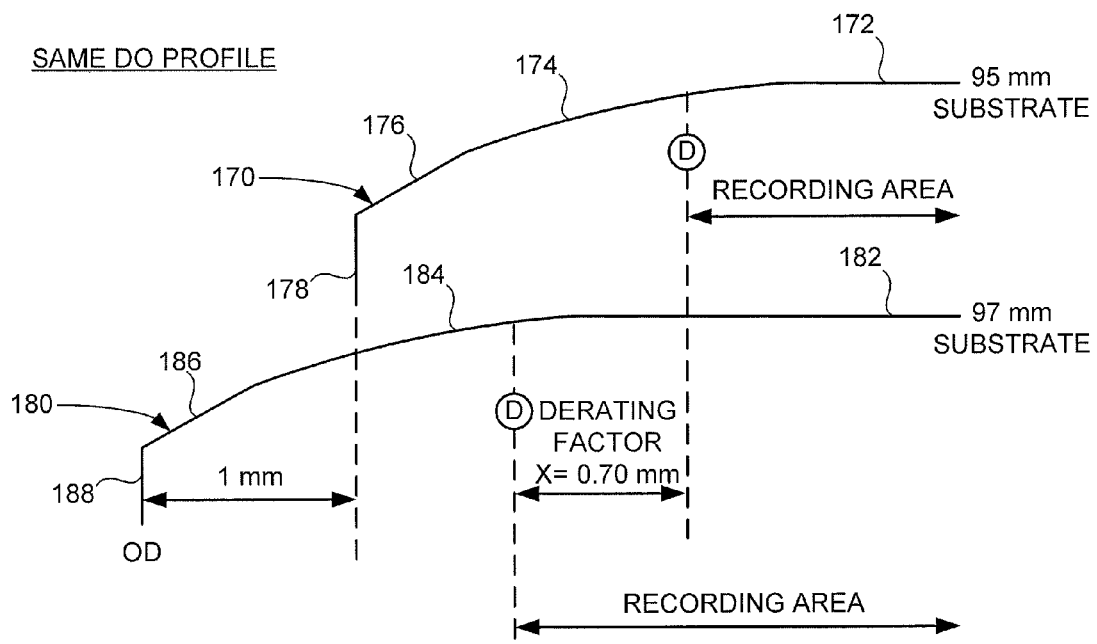
FIG. 6 is a schematic representation of different sized substrates sharing a common DO profile.

The present disclosure is generally directed to an enlarged substrate configuration for magnetic recording media. Magnetic recording media are often provided in the form of rotatable magnetic recording discs which are incorporated into a hard disc drive (HDD) data storage device. The discs are rotated at a selected rotational velocity and accessed by a moveable read/write transducing head ("transducer") which records and reads data in the form of magnetic domains.

The progression in the HDD industry from 14 inch, 11 inch, 8 inch, 5½ inch, 3½ inch, 2½ inch to 1.8 inch and smaller storage device form factors is well documented. The progression to successively smaller form factor sizes was initiated by the floppy disk market, and followed by HDD manufacturers which produced HDDs of corresponding size. This was in part due to the standardization of mounting sizes of computer bays that could be used to secure the respective floppy disk drives and hard disc drives.

Each smaller form factor was (and remains) generally half as wide and half as long as the immediately larger form factor. This essentially allows two smaller devices to fit in the space provided for one larger device. For example, a 3½ inch form factor HDD has length and width dimensions of nominally 146.1 millimeters, mm (5.75 inches, in) by 101 mm (4.00 in). A 2½ inch form factor HDD has length and width dimensions of nominally 101 mm (4.00 in) by 73 mm (2.88 in), and so on.

Some of the earliest versions of commercially successful hard disc drives were referred to as "Winchester" drives, based on the so-called 30/30 system configuration from International Business Machines (IBM). The smaller 8 inch and 5½ inch versions were also referred to as "Winchester" drives. Smaller form factor drives in what later became known as the 3½ inch form factor class were initially widely referred to as "Micro-Winchester" drives. The 2½ inch drives did not enjoy a common moniker but were sometimes referred to as either "Micro-Miniature-Winchester" or "Mini-Winchester" drives. The HDD industry quickly standardized on a media size of 95 mm (OD) discs for the 3½ inch form factor and 65 mm (OD) discs for the 2½ inch form factor.

A typical magnetic recording disc comprises a magnetic recording structure that is formed on an underlying substrate. The recording structure can take a variety of forms and may include seed layers, interlayers, a soft underlayer, one or more magnetic recording layers, a carbon overcoat (COC) layer, a lubricant layer, etc. The substrate can be formed from a suitable rigid, disc-shaped material such as glass, metal, etc.

For magnetic recording discs that are incorporated into 2½ inch form factor and 3½ inch form factor HDDs, the substrates normally include an inner sidewall at a radius of 12.5 mm, an outer sidewall at a radius of nominally 32.5 mm (for 65 mm discs) and 47.5 mm (for 95 mm discs), opposing top and bottom flat surfaces that extend substantially from the inner sidewall to the outer sidewall, and relatively small, inner and outer chamfered surfaces between the top and bottom flat surfaces and the respective inner and outer sidewalls. The chamfered surfaces extend at a suitable angle, such as 45 degrees, and provide gripping surfaces for use during manufacturing since it is generally undesirable to mechanically contact either the flat surfaces of the substrates or the flat surfaces of the completed magnetic recording media. Substrate thicknesses can vary but may be on the order of around 1 mm.

A polishing process is often applied to a substrate prior to the formation of the recording structure thereon. The polishing process is intended to achieve a specified flatness for the top and bottom flat surfaces of the substrate in terms of maximum axial deviation in localized changes in elevation of the substrate material.

One difficulty associated with the substrate polishing process relates to relief zones that tend to be formed adjacent the respective inner and outer ends of the flat surfaces. The sharp junctions between the flat surfaces and the respective inner and outer chamfered surfaces tend to be treated as high points by the polishing process, so that abrupt relief zones may be formed on the substrate adjacent the inner and outer sidewalls.

The relief zones can provide negative deviation or positive deviation from the elevation of the adjacent flat surface. Negative deviation relief zones are sometimes referred to as duboff (DO) zones, and positive deviation relief zones are sometimes referred to as ski jump (SJ) zones. The relief zones can extend a significant radial distance across the surfaces of the substrates, such as on the order of about 2 mm.

The relief zones located adjacent the inner sidewall of a substrate may not have a significant effect on performance since this portion of the finished recording disc is usually covered by an inner clamp or spacer ring used to secure the finished disc to a spindle motor hub. The relief zone located adjacent the outer sidewall, however, can have a significant effect on overall HDD performance. The outermost active area of a magnetic recording disc has the highest linear velocity in a constant angular velocity, CAV rotation system, and accordingly provides the highest available data transfer rate. The outermost active area thus represents the most valuable real estate on the entire disc and is often utilized for high speed caching and other data I/O intensive storage applications.

Data transducers are designed to be hydrodynamically supported (e.g., "fly") in very close proximity and in non-contacting relation with the associated recording surfaces of a magnetic recording medium. Such transducers can provide stable and controllable flight over areas having flatness within a very small tolerance, such as +/−5 nanometers, nm ($10^{-9}$ m).

As a data transducer is moved outwardly over a relief zone that changes in elevation away from the flat recording area of a disc, such as by curving down in a DO zone or curving upwardly in an SJ zone, at some point the flight characteristics of the data transducer will become unstable and the transducer will experience a variety of undesired flight characteristics including increased fly height, oscillations and/or disc contact. In some cases it has been found that data transducers become unstable responsive to a positive or negative change in elevation over a range beginning as little as about 100-200 nm. As fly heights and transducing element sizes continue to decrease, it is expected that sensitivity to elevational changes in the disc topography will continue to increase, so that future heads will become unstable at even lower elevational ranges.

The substrate polishing process involves a tradeoff between achieving specified flatness requirements over the majority of the recording surface area and obtaining well controlled relief zone characteristics. Enhancements to the polishing of the flat areas of a substrate can, in some cases, degrade the characteristics of the substrate near the outermost diameter of the substrate, and vice versa. More specifically, polishing parameters such as pad compressibility, abrasive particle size, applied polishing force, duration, slurry composition, etc. can be optimized to obtain a smoother (flatter) surface, but this is often at the expense of greater erosion/deformation in the outer relief zone, which can effect the ultimate radius at which data can be reliably written on a finished recordable medium. Conversely, tuning a polishing process to achieve desired outer relief zone characteristics can result in less than desired levels of flatness of the main flat extents of the substrate.

Accordingly, various embodiments of the present disclosure are generally directed to a novel approach whereby a larger zone of substrate flatness is achieved for existing form factor HDD products through the use of enlarged substrates. As explained below, in some embodiments an enhanced substrate size is used for a given HDD form factor size. For purposes of illustration and not by way of limitation, in some cases substrates having an outer diameter of nominally 97 mm, rather than the standard 95 mm, are used to form media for a 3½ inch form factor HDD. Similarly, substrates having an outer diameter of nominally 67 mm, rather than the standard 65 mm, are used to form media for a 2½ inch form factor HDD.

Other enhanced sizes can be used. For example, in some cases, substrates of nominally 98 mm and 68 mm are used. In other cases, substrates of nominally 99 and 69 mm are used. In still other cases, substrates of from about 96.9 mm up to about 100.4 mm are used for 3½ inch form factor drives, and substrates of from about 66.9 mm up to about 71.8 mm are used for 2½ inch form factor drives. In still further cases, substrates greater than 100.4 mm are used in 3½ in form factor drives and substrates greater than 71.8 mm are used in 2½ inch form factor drives.

The use of substrates of at least about 97 mm and 67 mm in diameter, respectively, provides at least an additional 1 mm of radial distance outwardly for each substrate as compared to the standard substrate sizes of 95 mm and 65 mm. Such sizes of substrates, and finished recording media, can be readily accommodated in the associated form factor sizes; more specifically, a nominally 97 mm disc can readily be accommodated into a 3½ inch form factor HDD with nominal dimensions of about 146.1 mm by about 101 mm, and a nominally 67 mm disc can readily be accommodated into a 2½ inch form factor HDD with nominal dimensions of about 101 mm by about 73 mm.

In some embodiments, the same polishing parameters are utilized to polish the respective 97 mm and 67 mm OD media as is used for respective 95 mm and 65 mm OD media. It will be appreciated that, all things otherwise being equal, a 97 mm OD substrate will have generally the same DO and/or ski jump elevation zone characteristics as a 95 mm OD substrate subjected to the same processing, and the same is generally true for a 67 mm OD substrate as compared to a 65 mm OD substrate. The radial location of the associated outer relief zones, however, will be moved outwardly by about 1 mm or more.

While not necessarily required, derating the radial distance dedicated to the storage of data in an HDD, so that less than the extra 1 mm of radial distance is actually used to record data, can produce significantly better manufacturing yields and product performance. In some embodiments, a derating factor X which is less than 1 is applied, such as an X factor of 0.70. In other embodiments, derating factors include but are not limited to 0, 0.05, 0.10, 0.15, 0.20, 0.25, 0.30, 0.35, 0.40, 0.45, 0.50, 0.55, 0.60, 0.65, 0.75, 0.80, 0.85, 0.90, 0.95, 0.96, 0.97, 0.98 or 0.99. Other derating values can be used as well.

In this way, less than the entire extra amount of space is used to record data; for example, if nominally 1 extra mm of radial extent is provided, then a derating factor of 0.70 results in an 0.70 mm of additional recording area, which is located at the most valuable location on the disc. It will be appreciated that other derating factors can be used, including derating factors that are less than or greater than 0.70. In some cases, a derating factor of 0 is used so that the larger disc has the same data storage area as a conventionally sized disc (e.g., a 97 mm disc stores the same amount of data as a 95 mm disc; a 67 mm disc stores the same amount of data as a 65 mm disc). In other cases, a derating factor of 0.99 is used so that almost all of the newly available area is used for the recording of data.

These and other features of various embodiments of the present disclosure can be understood beginning with a review of FIG. 1 which provides a top plan view of an example substrate 100. The substrate 100 is formed of glass, and may be subjected to chemical processing as is known in the art. Other material configurations and processing can be used, including substrates made of aluminum or other metals, etc. The substrate 100 has an overall diameter D, which in this case is nominally 97 mm, and is designed for recording media to be used in a hard disc drive (HDD) of 3½ inch form factor. Other sizes can be used, including but not limited to an outermost diameter of nominally 98 mm.

The substrate 100 has a center point 102 about which the substrate (and finished medium) is configured to rotate. An inner sidewall 104 forms a central aperture in the substrate 100. The sidewall is provided at a selected radius such as nominally 12.5 mm from the center point 102. The substrate has an outer sidewall 106, which constitutes a substantially vertically extending edge, at a radius of nominally 48.5 mm from the center point 102. It will be appreciated that other diameters for the substrate 100 can be used, including without limitation an outer diameter of nominally 96.9 mm to nominally 100.4 mm.

FIG. 2 shows a top plan for a substrate 110 that is also formed of glass and subjected to chemical processing as known in the art, and has an overall diameter D which in this case is nominally 67 mm. Without limitation, the substrate is designed for recording media to be used in an HDD with a 2½ inch form factor. Other material configurations and processing can be used, including substrates of nominally 68 mm. As with the substrate 100, the substrate 110 is configured for rotation about a center point 112 and has an interior sidewall 114 at radius 12.5 mm and an outer sidewall 116 at nominally 33.5 mm. As before, other outer diameters for the substrate 110 can be used including, without limitation, diameters of nominally 66.9 mm to nominally 71.8 mm.

FIG. 3 shows another substrate 120 in accordance with some embodiments. The substrate 120 is shown in a cross-sectional elevational mode. Aspect ratios and other relative dimensional aspects may vary. The substrate 120 has an inner sidewall 122 at radius R1 and an outer sidewall 123 at radius R2. These values R1 and R2 can correspond to the radii set forth in FIGS. 1-2 above for the 97 mm substrate 100 and the 67 mm substrate 110, or can correspond to other values. Chamfered surfaces are depicted at 124, 125, 126 and 127. The chamfered surfaces extend at an angle of 45 degrees although other angles can be used as desired, such as but not limited to 25 degrees. Opposing top and bottom flat surfaces are denoted at 128 and 129.

The substrates 100, 110 and 120 are in an unpolished state and can be manufactured using known processing techniques apart from the specialized dimensions and other information disclosed herein. Such processing may include cutting the disc-shaped substrates from planar glass or other material having a thickness substantially corresponding to the final finished thickness of the substrates. Drilling and beveling operations may be applied to provide the substrates with the various features shown in FIG. 3.

FIG. 4 depicts a polished substrate 130 corresponding to the substrates 100, 110 and 120 after the application of a polishing process. The polished substrate 130 has upper and lower flat surfaces 132, 134, outer sidewall 136 (OD surface), and upper and lower relief zones 138, 140. The relief zones 138, 140 are characterized as duboff (DO) zones and provide a radiused decrease in elevational topography of the substrate with respect to the respective flat surfaces 132, 134. It will be appreciated that the substrate 130 is merely illustrative and different relative dimensions of the various depicted aspects can be provided. The pre-polishing profile is depicted in broken line fashion.

A head is denoted at 142 and may represent a data transducing head (transducer) used once a magnetic recording structure has been formed on the substrate 130, or may represent a special test head (e.g., a glide head) used during evaluation of the polished substrate prior to magnetic structure fabrication.

It can be seen that the polishing process generally rounds off the sharp junctions between the flat surfaces and the outer chamfered surfaces, and erodes the substrate toward the substrate center point. Reference point A generally depicts an outer extent of the upper flat surface 132 and thus denotes the radial transition point between the flat surface 132 and the DO relief zone 138. Point A is sometimes referred to as a radius of rolloff, or ROR point. Reference point B represents a point at which the head 142 experiences unstable flight characteristics due to the negative deviation distance between the flat surface 132 and the relief zone 138 at this point. As noted above, this can vary based on a variety of factors but in some cases may be on the order of about 100-200 nm.

Reference point C identifies the maximum deviation distance from the (original) flat surface elevation of the substrate, and thus indicates the maximum change in thickness resulting from the polishing process. Reference point D identifies the outermost extent of the recording area on the finished magnetic recording disc.

It will be appreciated that the various layers of the recording structure may be applied to the entirety of the outer surfaces of the substrate 130, but the HDD will be configured such that the outermost active data track is at the radius corresponding to point D. A ramp load structure may be placed just outside of point D to facilitate unloading and loading operations of the head 142.

Point D may be at the same location as point B, or may be radially inward of point B as shown. The relative locations and spacings of points A-D can vary depending on a variety of factors including the polishing process, composition of the substrate, chemical processing applied to the substrate, test data, product specifications, etc.

In some cases, the distance from the outer sidewall (OD surface) 136 to point A may be on the order of from about 2.2 mm to about 2.5 mm. The distance from the OD surface 136 to point B may be on the order of from about 1 mm to about 1.5 mm. The distance from the OD surface 136 to point C may be on the order of from about 0.2 mm to about 0.5 mm. The distance from the OD surface 136 to point D may be on the order of from about 1.8 mm to about 2.0 mm. These ranges are merely exemplary and other respective radial distances may be obtained, including distances that are greater or smaller than these ranges.

FIG. 5 depicts another example polished substrate 150, which also may arise from the application of a polishing process to one of the foregoing unpolished substrates 100, 110, 120. The polished substrate 150 exhibits a ski jump (SJ) relief zone configuration, characterized as a positive elevation in the relief zone adjacent the OD of the substrate. The ski jump profile is generated by displacement of the substrate material during the polishing process. In some cases, both DO and SJ characteristics may arise on the same substrate at different locations.

The polished substrate 150 includes opposing upper and lower flat surfaces 152, 154; outer sidewall (OD surface) 156; and upper and lower ski jump (SJ) relief zones 158, 160. As before, point A denotes an outer radial extent of the flat surfaces 152, 154, and therefore connotates a radius of rolloff (ROR) point. Point B denotes the maximum change in elevation over the relief zones 158, 160 at which a head 162 becomes unstable. Point C is the location of the maximum elevation of the relief zones 158, 160, and point D represents the outermost radial extent of the recording area on the finished recording disc. The various distances from the OD surface 156 to points A-D may correspond to the values provided above in FIG. 4, or may be different.

FIG. 6 depicts a standard sized substrate and an enlarged substrate for purposes of comparison. A 95 mm substrate is represented at 170, and a 97 mm substrate is represented at 180. The standard (95 mm) substrate 170 includes flat surface 172, DO relief zone 174, chamfer 176 and OD surface 178. The enlarged (97 mm) substrate 180 similarly includes flat surface 182, DO relief zone 184, chamfer 186 and OD surface 188. The respective substrates 170, 180 have nominally the same DO profile. The substrate 180 has an overall radius that is nominally 1 mm larger than the substrate 170. Outermost recording areas for the respective substrates are denoted at respective points D.

It can be seen that enlarging the substrate size from 95 mm to 97 mm could allow for the recording area on the larger substrate to be increased by a full millimeter in radial extent (or whatever radial difference exists between the two substrates), thereby increasing the overall data storage capacity of the resulting 97 mm finished recording disc over what was available on the standard sized 95 mm finished disc.

However, in some embodiments a derating factor is used so that less than all of the newly available real estate is dedicated to the storage of data. The derating factor, identified as the value X, has a value of from 0 to 1 and represents a fraction (or percentage) of the additional radial extent that is used for the storage of data in the HDD. As shown in FIG. 6, a derating factor of 0.70 (70%) is used so that, for an increase in radial size of 1 mm, the larger 97 mm substrate provides a final recording area of an additional 0.70 mm over the 95 mm substrate 170. It will be appreciated that if a 99 mm disc is used with a derating factor of 0.70, then an additional 1.4 mm of recording space (out of 2.0 mm total radial increase) would be used for the storage of data, and so on. The derating factor can be any suitable value as noted above.

While not required, one reason for the use of the derating factor is based on the recognition that variability in the magnetic disc manufacturing process can result in manufacturing yield losses (scrap) at various stages in the HDD manufacturing process. In some cases, a first percentage loss X % of product may be lost at the polishing process, so that X % of all polished substrates must be scrapped. A second percentage loss Y % of product may be lost once the magnetic recording structures have been formed on the viable substrates, such as through the use of the aforementioned glide test heads (e.g., 142, 162 in FIGS. 6-7). A third percentage loss Z % may be lost after HDD assembly when operational transducers (e.g., 142, 162 in FIGS. 6-7) contact the outer extents of the finished recording discs. Total losses may be calculated as (X+Y+Z) %, but it can be seen that the latter losses, particularly at the HDD product level, can be extremely costly.

Accordingly, by derating the outermost extent of the recording area so that less than all of the available extra space is not used for the recording of data, it is contemplated that significant cost savings, by way of increased manufacturing yields, can be experienced at each of the above three manufacturing levels, as well as potentially at other manufacturing levels as well. For example, process enhancements such as faster, more aggressive polishing processes, etc. may lead to further economic benefit from the use of the various embodiments set forth in the present disclosure.

While FIG. 6 depicts 95 mm and 97 mm substrates, it will be appreciated that similar benefits can be achieved using 67 mm substrates as compared to 65 mm substrates, etc.

Figure 7:
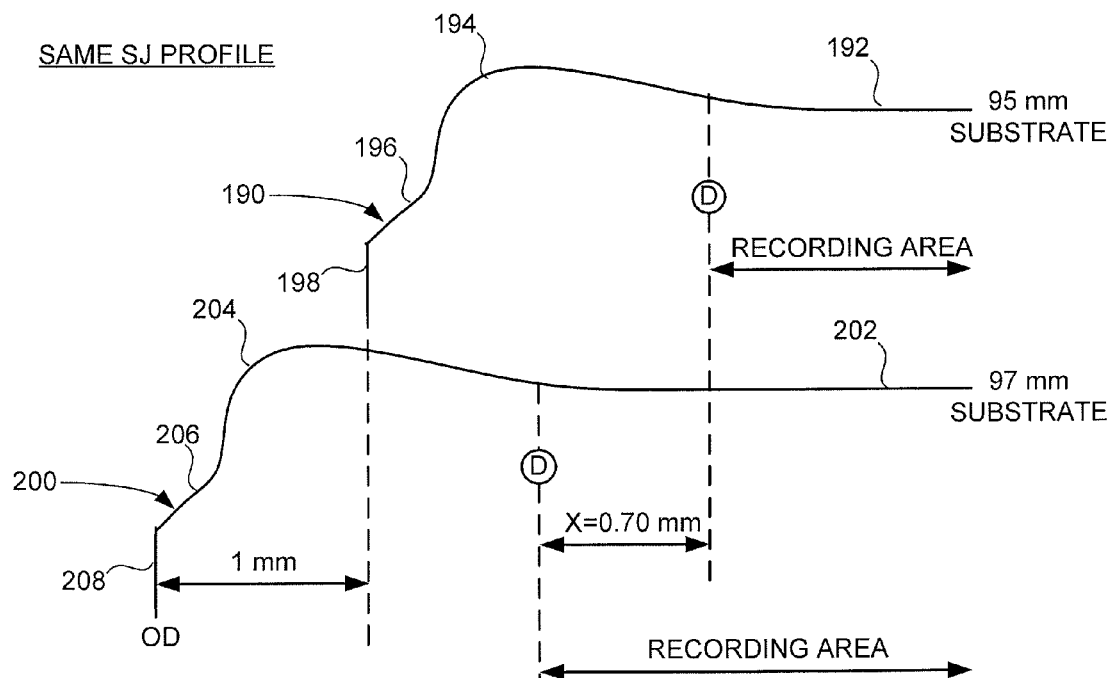
FIG. 7 is a schematic representation of different sized substrates sharing a common SJ profile.

FIG. 7 is somewhat similar to FIG. 6 in that it depicts 95 mm and 97 mm substrates 190, 200 that share a common ski jump (SJ) profile. As before, the 95 mm substrate 190 includes flat surface 192, SJ relief zone 194, chamfer 196 and OD surface 198. The 97 mm substrate 200 includes flat surface 202, SJ relief zone 204, chamfer 206 and OD surface 208.

The 97 mm substrate 200 has a radius that is nominally 1 mm larger than the 95 mm substrate 190. A derating factor of X=0.7 is again used in FIG. 7 so that the recording area of the 97 mm substrate 200 is increased by 0.7 mm as compared to the 95 mm substrate 190.

Figure 8:
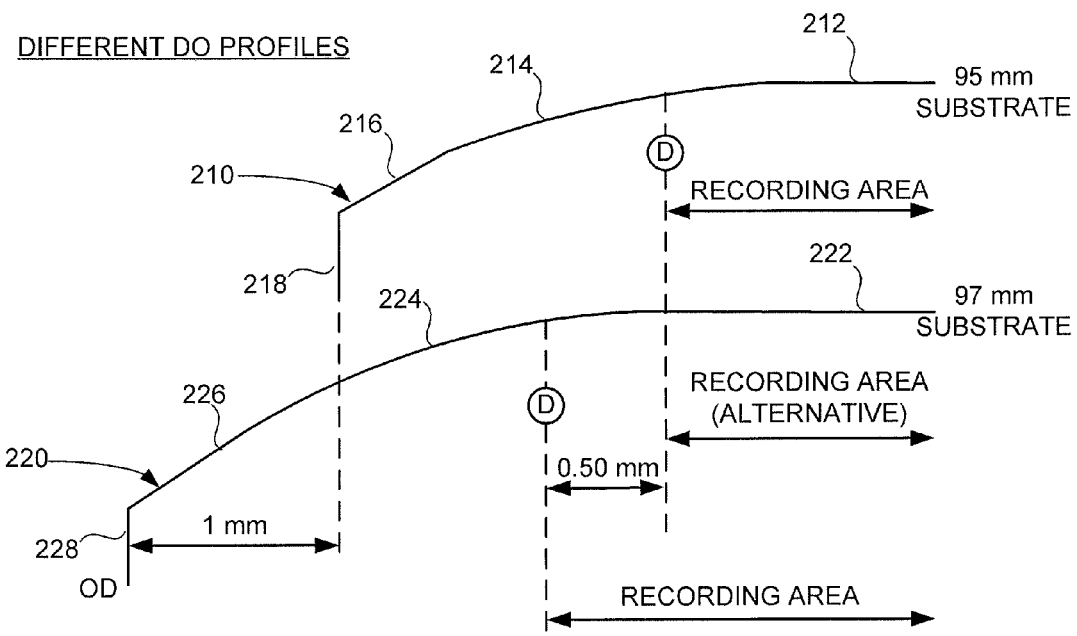
FIG. 8 is a schematic representation of different sized substrates with different DO profiles.

FIG. 8 depicts a standard sized substrate and an enlarged substrate having different DO profiles. As before, the respective substrates are represented as a 95 mm substrate 210 and a 97 mm substrate for illustration purposes, but other size substrates can be used as desired. The different DO profiles may arise from a variety of reasons. In some embodiments, a different polishing process is applied to the larger 97 mm substrate 220, providing enhanced flatness at the expense of greater material removal at the OD.

The standard sized 95 mm substrate 210 has flat surface 212, DO relief zone 214, chamfer 216 and OD surface 218; the enlarged 97 mm substrate 220 has flat surface 222, DO relief zone 224, chamfer 226 and OD surface 228. As before, the 97 mm substrate 220 has a radial extent that is nominally 1 mm larger than the 95 mm substrate 210.

A derating factor of 0.50 is applied so that, in one approach, the recording area of the 97 mm substrate 220 is increased by 0.50 mm. Alternatively, a derating factor of 0 is applied such that both substrates 210, 220 have nominally the exact same recording area. It can be seen that in this latter case the 97 mm substrate would be expected to have a significantly better manufacturing yield in the disc and HDD manufacturing process, as well as exhibiting increased reliability, etc.

Figure 9:
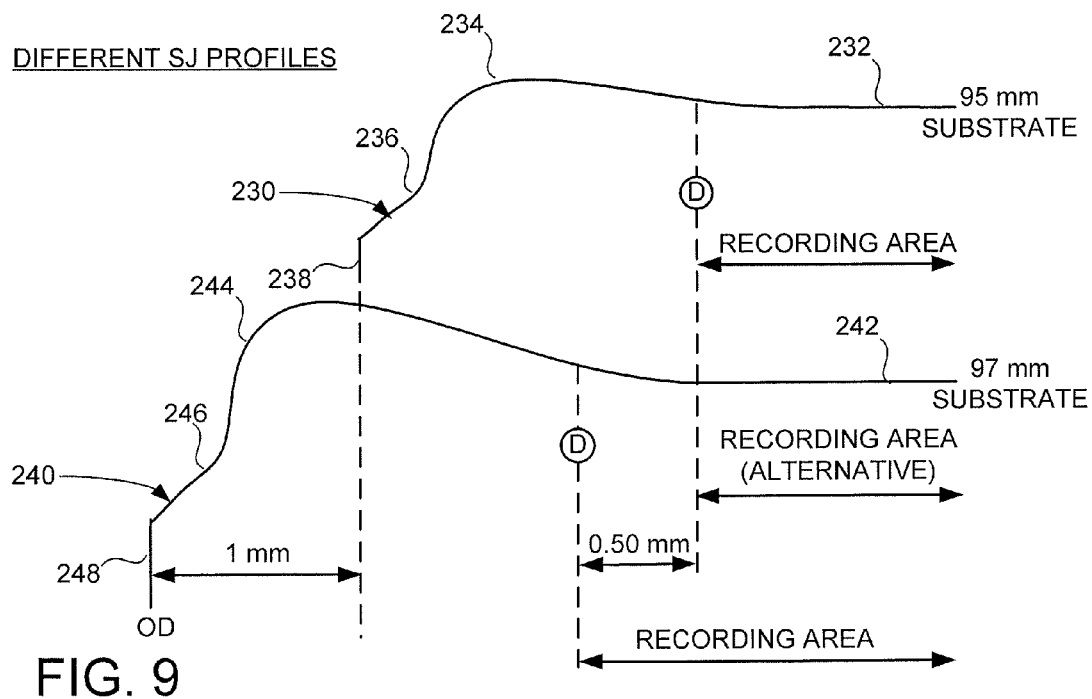
FIG. 9 is a schematic representation of different sized substrates with different SJ profiles.

FIG. 9 depicts two different substrates with different SJ profiles. A 95 mm substrate 230 has flat surface 232, SJ relief zone 234, chamfer 236 and OD 238. An enlarged 97 mm substrate 240 has flat surface 242, SJ relief zone 244, chamfer 246 and OD 248. Different polishing is applied to the respective substrates so that the flat surface 242 of the 97 mm substrate is superior to the flat surface 232 of the 95 mm substrate, allowing higher manufacturing yields and performance with regard to the recording structures formed thereon. However, in at least some cases the more effective polishing process (which may take less time) may result in a significantly greater elevational deviation for the SJ relief zone 244 as compared to the SJ relief zone 234.

As before, the recording area for the larger substrate 240 can be increased, or set to be nominally the same size as the recording area for the standard sized substrate 230.

FIGS. 10-12 depict aspects of a polishing system 300 that can be used to polish substrates 302 as discussed hereinabove in accordance with some embodiments. The polishing system 300 accommodates the concurrent polishing of a plurality of the substrates 302 which are inserted into pockets 304 of rotatable carriers 306.

The loaded carriers 306 are sandwiched between opposing upper and lower pads 308, 310, which rotate in opposing directions as generally depicted in FIG. 12. Inner and outer tracking mechanisms, such as gear teeth, spaced apart pins, etc. are provided at 312, 314 in FIG. 10. Thus, as the pads 308, 310 rotate about a main central point 316, the carriers 306 also rotate around respective central points 318 of each carrier (FIG. 11). This provides a kinematic sweep, or circuitous path, for each substrate 302 as it passes through a full rotation around the center point 316.

As shown in FIG. 11, each of the pockets 304 have a center point that is aligned at a selected radius 320 of the carrier 306. This selected radius 320 is sometimes referred to herein as a "bolt circle."

The pads 308, 310 may have various characteristics such as stiffness (compressibility), form, abrasiveness, etc. A slurry of abrasives and other materials may be introduced to facilitate the polishing process. As noted above, more aggressive polishing approaches can be taken since it is less important that the outermost portions of the substrates be maintained within specified tolerances to achieve the desired outermost recording area characteristics.

In some embodiments, a method and formula can be provided to optimize the kinematic sweep of the substrates 302 irrespective of tool type (e.g., polisher's gear radius, plate size, etc.) so as to keep the pockets 304 at a safe distance from the edges of the pads 308, 310 to prevent damage from scratches while optimizing kinematic sweep. The formula and method generally include calculating a gap distance from pad to gear and then calculating the distance from the edges of the pads 308, 310 to the bolt circle 320. It will be appreciated that, during polishing, all portions of the substrates 302 should remain within the inner and outer edges of the pads 308, 310 (e.g., the carrier pockets 304 have to be fully over/under the pads 308, 310).

There are at least two issues associated with current methods for locating the pockets on a carrier (that is, calculating the size and location of the bolt circle 320).

The first issue is not taking the pad area into consideration. If the outside of the pocket 304 is free to travel beyond the edge of the pad (pad diameter), the part being polished is able to pick up debris that collects at the edges of the pads 308, 310. This increases the chances of dragging foreign debris or particles back onto the pads as the part continues to rotate inwards and becomes an obvious source of scratch defect on the parts being polished.

Being aware of the first problem means that one should design the carrier 306 (including the bolt circle 320) with how it relates to the pads 308, 310. This usually means either making a rough estimate, by putting the carrier on the machine and measuring, or using a CAD system to see the relationship. This is time consuming and subject to erDO.

Moreover, this becomes even more difficult if different OD sizes of substrates are used, as disclosed herein.

The following formula can be used to calculate the bolt circle diameter, regardless of machine type, disc pocket size, or carrier size:

$$BC = C - \left[\left(\frac{OG}{2} - \frac{P}{2}\right) + \frac{CP}{2} + K\right] \quad (1)$$

where BC is the bolt circle diameter (in millimeters, mm), C is the carrier diameter, OG is the outer gear diameter, P is the pad diameter, CP is the carrier pocket diameter, and K is a derating constant that controls the amount of distance from the edge of the pocket to the edge of the pad. A suitable value for K may be 10, or some other value.

In some embodiments, being less concerned about the location of the ROR point and the topography of the substrate beyond the ROR point can allow use of a more compressible pad, which may facilitate the use of a slightly larger particle size. In one example where an abrasive particle size (d50) of about 0.6-0.8 micrometer, μm (d50) and a relatively harder pad were required to meet certain polishing criteria for a set of substrates, it was found that a larger abrasive particle size of about 0.8-1.0 μm particle size with a softer pad could be safely used. The larger particle size generally increased removal rate of the material ("stock removal rate"), and the use of a softer pad absorbed the pressure from the larger partices in the distribution. As a result, sub-surface damage from the polishing process was found to be similar to using the original (0.6-0.8 μm) sized partice/harder pad combination.

Using the same particle size, but increasing pressure, would also tend to increase the stock removal rate. Again, if there is less emphasis on the location of the roll off radius point, higher pressure could be used to expedite the process and obtain improved polishing characteristics.

Polish slurries are formulated with edge condition (roll off radius) in mind. Less emphasis on roll off radius would allow slurry suppliers more freedom to formulate their slurries to provide optimum results for the recording portions of the finished discs.

Figure 13:
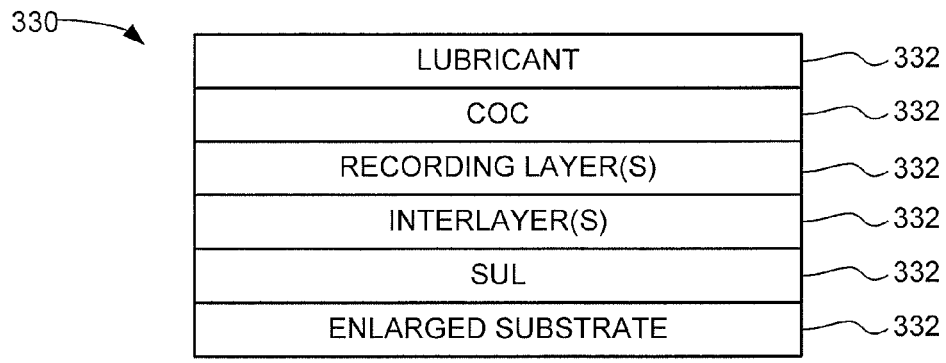
FIG. 13 is a schematic representation of a magnetic recording medium formed using the enlarged substrates of FIGS. 1-9 in accordance with some embodiments.

FIG. 13 is a schematic representation of a finished magnetic recording disc (medium) 330 in accordance with some embodiments. Other configurations can be used. Generally, the medium 330 includes a base substrate 332, a soft underlayer (SUL) 334, an interlayer 336, one or more recording layers 338, a protective carbon overcoat (COC) layer 340 and an optional lubricant layer 342. The various thicknesses of the respective layers can vary, and the substrate may be significantly thicker than the remaining layers.

The layers 334-342 form a magnetic recording structure. The magnetic recording structure can be adapted for use in a variety of operational recording environments, including but not limited to longitudinal recording, perpendicular recording, heat assisted magnetic recording (HAMR), bit patterned media, printed media, self-organizing media, CGC media, etc. It is contemplated that better magnetic data recording and read performance over the radial extent of the substrate can be obtained due to better flatness characteristics of the substrate.

The substrate 332 is contemplated as comprising an enlarged substrate as discussed above, such as but not limited to a substrate of OD dimensions of nominally about 96.9 mm up to about 100.4 mm for 3½ inch form factor drives, and nominally from about 66.9 mm up to about 71.8 mm for 2½ inch form factor drives.

Figure 14:
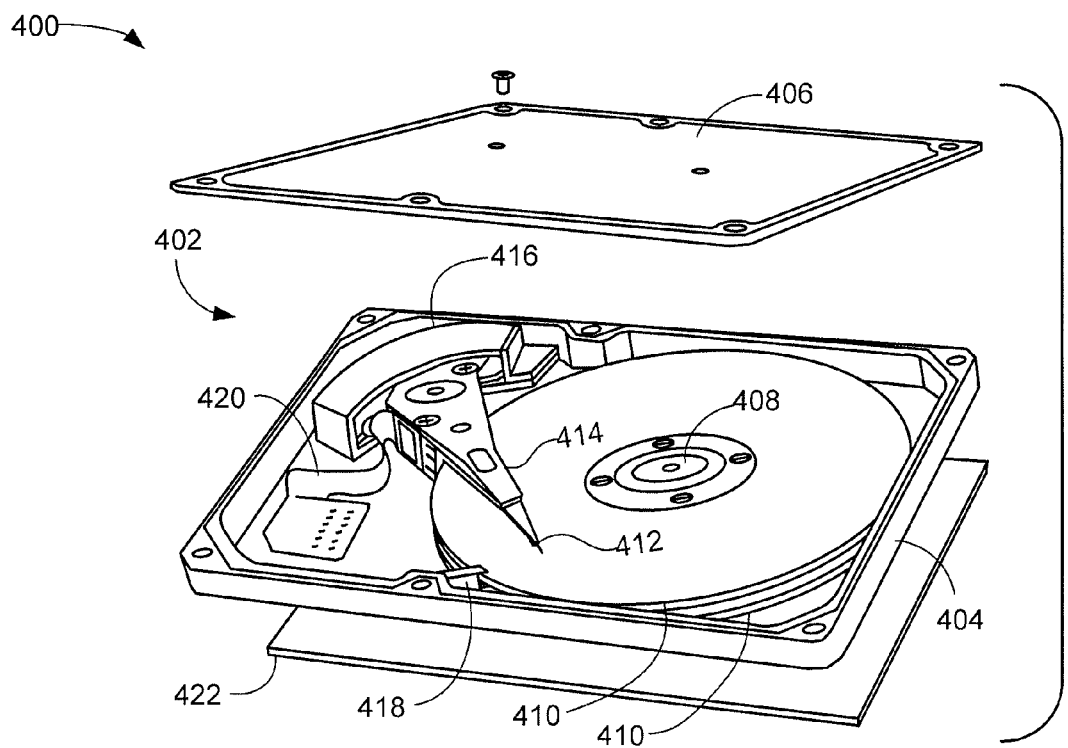
FIG. 14 is an exploded representation of a hard disc drive (HDD) that uses the recording medium of FIG. 13 in accordance with some embodiments.

FIG. 14 is a simplified representation of standard sized hard disc drive (HDD) 400 with magnetic recording media having an enlarged outer diameter. In the case of a 3½ inch form factor, the HDD 400 has outer length and width dimensions of nominally 146.1 mm by 101 mm. In the case of a 2½ inch form factor, the HDD has outer length and width dimensions of nominally 101 mm by 73 mm Media of 97 mm or 67 mm, or other sizes larger than the standard 95 mm or 65 mm sizes, may be used as discussed above.

The HDD 400 includes a head disc assembly (HDA) 402 housed within a base deck 404. A top cover 406 is mated to the base deck 404 to provide an environmentally controlled interior environment for the HDD 400.

A spindle motor 408 is mounted to the base deck 404 to rotate a stack of magnetic recording media (discs) 410, in this case two, at a constant high speed such as 10,000 revolutions per minute (rpm). Data read/write transducing heads (transducers) 412 are controllably advanced across recording surfaces of the media 410 by way of a rotatable actuator 414 and a voice coil motor (VCM) 416.

A load/unload ramp structure 418 is positioned adjacent an outermost diameter of the media 410 to receive the transducers 412 when the HDD is deactivated. A flex circuit 420 provides control signals between the transducers 412 and HDD electronics on an externally mounted printed circuit board assembly (PCBA) 422.

A standard form factor configuration drive may require some internal modifications to accommodate a larger media size as described herein. The position and extent of the ramp structure 418, for example, may require adjustment to accommodate the larger discs/substrates. Similarly, outer shroud surfaces may require adjustment outwardly to accommodate the extra required clearance for the enlarged discs/substrates. It is contemplated that there is sufficient room within the confines of a 3½ inch form factor drive to accommodate discs of up to about 100.4 mm in diameter, and there is sufficient room within the confines of a 2½ inch form factor drive to accommodate discs of up to about 71.8 mm in diameter. Other sizes can be used as well.

Figure 15:
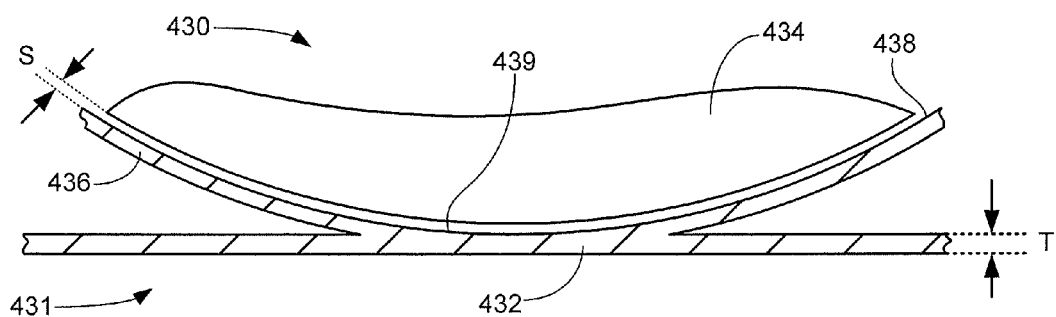
FIG. 15 illustrates a sidewall of a base deck housing member of an HDD such as represented in FIG. 14 in accordance with some embodiments.

FIG. 15 illustrates a portion of another standard sized HDD 430, which for purposes of illustration is contemplated as a 3½ inch form factor. Other sizes can be used such as the 2½ inch form factor. The HDD 430 includes a base deck 431 similar to the base deck 404 shown in FIG. 14 and has a substantially vertically extending sidewall 432. One or more rotatable magnetic recording discs 434 (in this case, two) are axially aligned for rotation within the interior confines of the base deck 431. The base deck 431 can be formed using any number of suitable processes including casting with secondary machining, injection molding, etc.

An interior shroud structure 436 is formed as a portion of the base deck 431. The shroud structure 436 includes an inner curvilinearly extending shroud surface 438 which extends in close proximity to the outermost edge of the discs 434. The shroud structure 436 is integral with the base deck sidewall 432. In the embodiment of FIG. 15, the base deck sidewall 432 has a nominal thickness T, such as but not limited to about 0.2 mm, and a portion of the sidewall 432 includes a circumferentially extending shroud surface 439 that coextends with the shroud surface 438 to provide continuously curvilinear shrouding for the discs 434.

In this case, the minimum sidewall thickness T, and the minimum shrouding distance S (being the distance between the discs 434 and the shroud surfaces 438, 439) help to define the maximum outermost diameter of the discs 434. For example, in a 3½ inch form factor disc, the width is nominally 101 mm, and if T=0.2 mm and S=0.1 mm then a maximum disc diameter D can be given by:

$$D=101-2(T)(S)=101-2(0.2)(0.1)=101-2(0.3)=101-0.60=100.4 \text{ mm} \quad (2)$$

Accordingly, an outer diameter of 100.4 mm can be used with a base deck sidewall width of nominally 0.2 mm and a shroud surface clearance of nominally 0.1 mm. Similarly, for a 2½ diameter form factor having a width of nominally 73 mm, a largest outer diameter for the discs can be 71.8 mm using a sidewall width of 0.2 mm and a shroud surface clearance of 0.1 mm.

Figure 16:
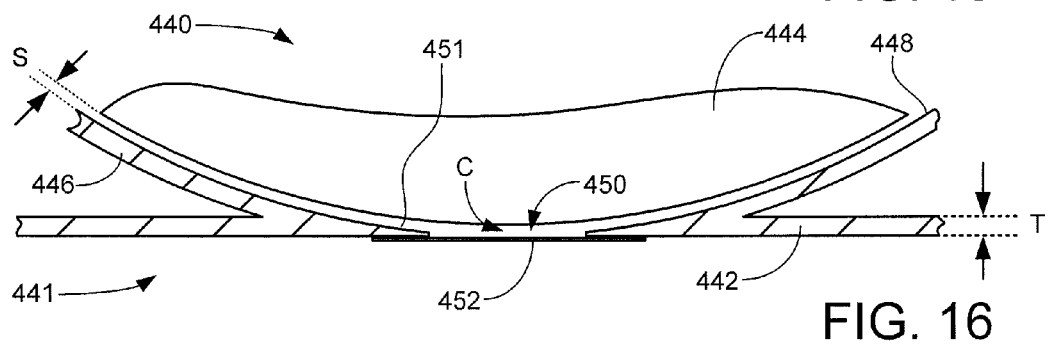
FIG. 16 is another sidewall of a base deck housing member in accordance with some embodiments.

FIG. 16 depicts another hard disc drive (HDD) 440 similar to the HDD 430 in FIG. 15. The HDD 440 is also contemplated as a standard sized form factor HDD, such as the 3½ inch form factor. The HDD 440 includes a base deck 441 with vertical sidewall 442, disc(s) 444, shroud structure 446 and interior shroud surface 448.

Figure 17:
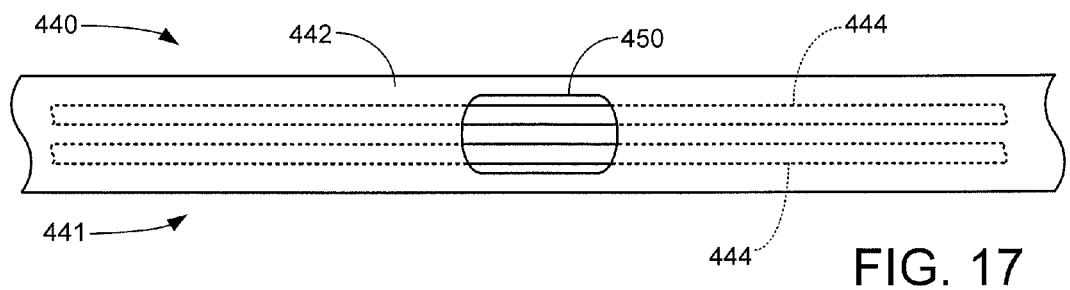
FIG. 17 is a side elevational representation of the base deck housing member of FIG. 16.

To enable further expansion of the size of the discs 444, the sidewall 442 is provided with a through-hole aperture 450, as shown in FIG. 17. The aperture 450 can take any suitable shape including round, square, elongated, curvilinear, etc. The sidewall thickness can taper as shown at 451 in a direction toward the aperture 450.

Figure 18:
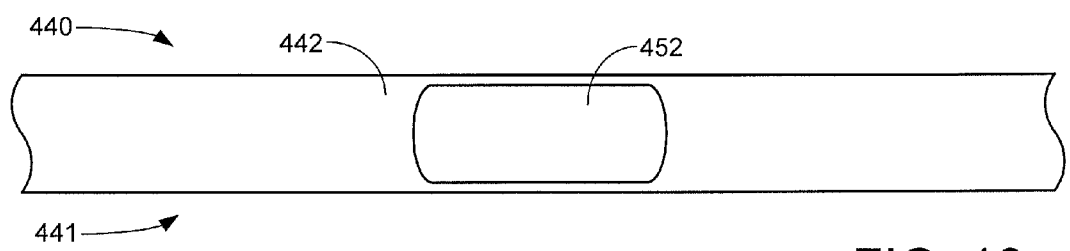
FIG. 18 shows the base deck housing member of FIG. 16 with an attached cover member.

A sealing member 452 can thereafter be applied to the sidewall 442 to sealingly cover the aperture 450, as depicted in FIG. 18. The sealing member can be a relatively thin material such as metal or plastic film. A layer of adhesive or other bonding agent (not separately shown) can be used to affix the sealing member 452 to the sidewall 442. The sealing member 452 thus constitutes a thinner section of the sidewall 442.

It can be seen from FIG. 16 that the use of a clearance aperture 450 and a sealing member 452 allows for further clearance reductions and corresponding increases in disc diameter. For example, if the minimum clearance distance C between the outermost edge of the discs 444 and the interior surface of the sealing member 452 is nominally equal to S (e.g. S=C=0.1 mm), then a maximum diameter of the disc D in a 3½ inch form factor is given by:

$$D=101-2(C)=101-2(0.1)=101-0.2=100.8 \text{ mm} \quad (3)$$

Accordingly, discs with diameters as large as about 100.8 mm may be used in 3½ inch form factor drives with the aperture and sealing member arrangement of FIGS. 16-18. Similarly, discs with diameters as large as about 72.8 mm may be used in 2½ inch form factor drives with the aperture and sealing member arrangement of FIGS. 16-18.

Figure 19:
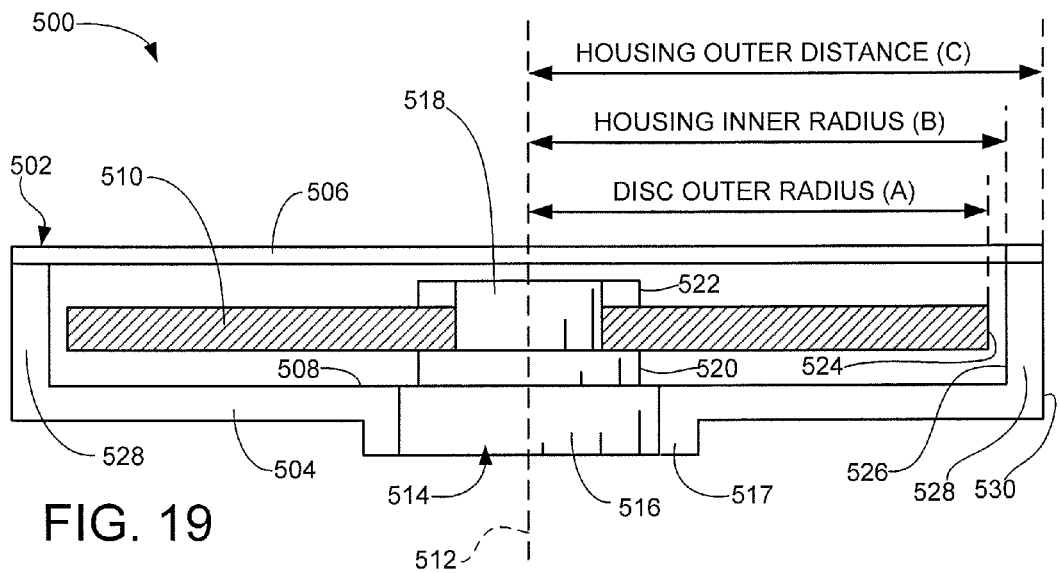
FIG. 19 is a schematic representation of another data storage device that uses a magnetic recording medium having an enlarged substrate.

FIG. 19 is a schematic depiction of another data storage device 500 in accordance with some embodiments. The data storage device 500 (hereinafter hard disc drive, HDD) is characterized as a standard-sized HDD such as a 3½ inch form factor HDD or 2½ inch form factor HDD. The schematic depiction of FIG. 19 is representational in nature and is not drawn to scale nor is it provided with accurate aspect ratios, profiles, etc.

The HDD 500 includes a housing 502 formed from a lower HDD housing member ("base plate") 504 and an upper HDD housing member ("cover") 506. The base plate 504 and cover 506 cooperate to form a sealed interior environment within the housing 502.

The base plate 504 has a base portion 508 which is a substantially planar member that extends normal to and in a spaced-apart relation with a magnetic recording disc 510. The magnetic recording disc 510 uses an enlarged substrate as discussed above, and may have various features as described above such as a planar portion, a duboff (DO) region, a ski jump (SJ) region, etc.

The magnetic recording disc 510 is arranged for rotation about a central axis 512 using a spindle motor 514. The motor 514 has a stationary portion (stator) 516 mounted within a boss 517 of the base portion 508 and a rotatable hub (rotor) 518 which supports the magnetic recording disc 510. The disc 510 is secured to the hub 518 using a lower shoulder member 520 and an upper clamp 522. While a single disc 510 is shown, it will be appreciated that multiple axially aligned discs can be provided with intervening spacers or other support members. An actuator assembly (not shown) supports a number of data transducers adjacent the upper and lower recording surfaces of the disc 510.

Distances A, B and C are shown in FIG. 19. These distances are measured from the central axis 512. The first distance A represents an average overall distance from the central axis 512 to an outermost circumferential edge 524 of the disc 510. An average overall distance is used since there may be a relatively small axial offset of the disc 510 relative to the hub 518. Nevertheless, the average overall distance will correlate to the overall diameter of the disc 510.

The second distance B represents an overall distance from the central axis 512 to an interior surface 526 of a sidewall portion 528 of the base plate 504. The interior surface 526 is in facing relation to the outermost edge 524 of the disc 510 and at a common elevation as the disc, as shown. The difference D between the distances A and B (D=B−A) corresponds to the average outermost clearance between the disc 510 and the base plate 504. As noted above, it is contemplated that this clearance distance D will tend to be smaller than what is normally achieved in conventional HDDs with standard sized media.

The third distance C in FIG. 19 represents an overall distance from the central axis 512 to an exterior surface 530 of the sidewall portion 528. For clarity, the view in FIG. 19 is contemplated as displaying the narrower width dimension of the device; that is, FIG. 19 provides a span (side-to-side outer distance between opposing sidewalls 528) of nominally 101 mm for a 3½ inch form factor drive and a span of nominally 73 mm for a 2½ inch form factor drive. While not necessarily limiting, it is contemplated that the central axis 512 will be nominally centered over this span.

Exemplary values for the distances A, B and C in FIG. 19 are set forth by Table 1.

TABLE 1

| HDD Size | A | B | C |
|---|---|---|---|
| 3½ inch form factor HDD | At least 48.5 mm | 50 mm or less | 50.5 mm |
| 2½ inch form factor HDD | At least 33.5 mm | 36 mm or less | 36.5 mm |

Other values can be used for the distance values A and B. The distance value C is largely fixed assuming a centered medium within the housing. It can be seen that using enlarged substrates as disclosed herein reduces the available budget for outer disc clearance (e.g., the distance D=B−A) between the discs 510 and the sidewall surfaces 526 of the HDD housing. Using a thinner sidewall 528 can enable the use of a larger substrate while still maintaining a given disc/sidewall clearance distance.

Figure 20:
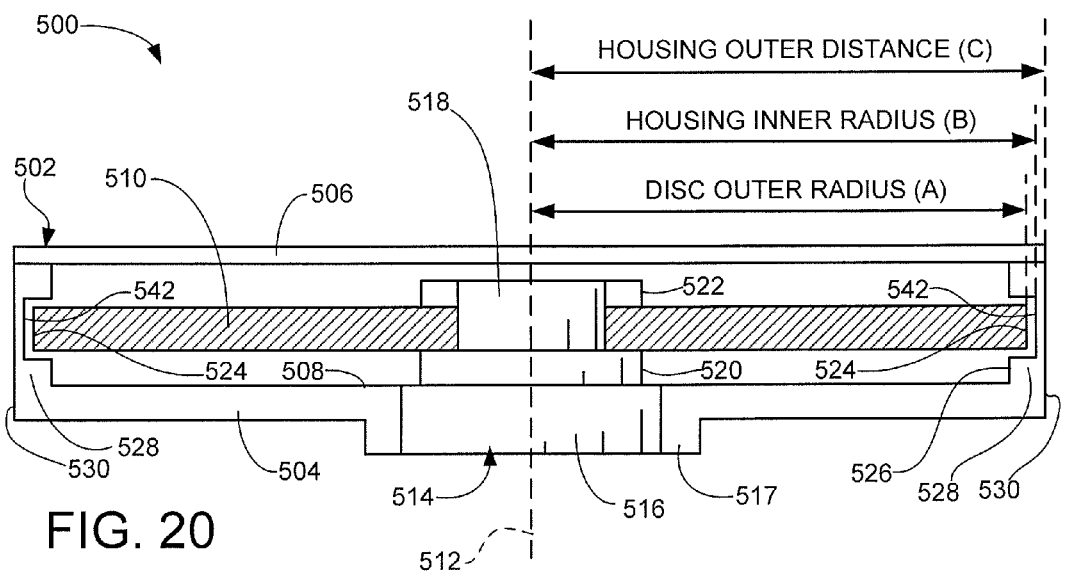
FIG. 20 is a schematic representation of another data storage device that uses a magnetic recording medium having an enlarged substrate.

FIG. 20 provides another option to facilitate the use of enlarged substrates, namely, the use of clearance channels (apertures) as described above in FIGS. 16-18. FIG. 20 shows a second HDD data storage device 540 substantially identical to the HDD 500 of FIG. 19, except as noted below. For ease of discussion, like reference numerals are used to denote similar components in FIGS. 19-20.

The opposing sidewalls 528 of FIG. 20 each include a clearance channel 542 which extends into the interior surface 526 of the sidewall as shown. The clearance channel 542 may extend partially into the sidewall or may extend all the way through the sidewall from the interior surface 526 to the exterior surface 530, in which case a cover member may be used to cover and sealingly span the clearance channel as depicted in FIG. 18. It will be appreciated that the sidewalls 528 have a nominal thickness and the clearance apertures 542 provide a localized reduction in thickness of the sidewalls.

The same general values for the respective distances A, B and C from Table 1 can be applied to the configuration of FIG. 20. The clearance channels 542 can further serve as disc deflection limiters to limit disc deflection responsive to mechanical shock events.

Figure 21:
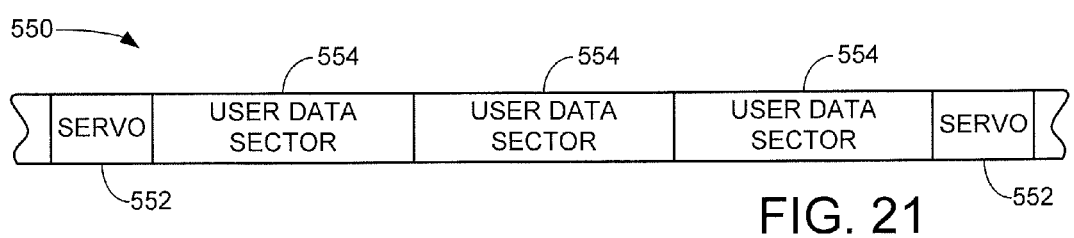
FIG. 21 illustrates a format for a track on a magnetic recording medium having an enlarged substrate.

FIG. 21 is an illustrative format for data tracks that may be formed on magnetic recording discs having enlarged substrates as disclosed herein. A data track 550 includes a number of spaced apart servo fields 552. The servo fields 552 store various types of servo control information used to control the position of data read/write transducers adjacent the media recording surfaces. The servo control data can include servo synchronization (sync) data, automatic gain control (AGC) data, index (angular position) data, Gray code (radial position) data, servo bursts (for intra-track position detection and control), RRO compensation values, etc.

The servo fields 552 may radially extend from the innermost diameter (ID) to the outermost diameter (OD) of the medium, much like spokes on a wheel. The servo fields may be written at a constant frequency or may be written at different frequencies at different radial locations.

User data sectors 554 are defined in the spaces along the tracks 550 between adjacent pairs of the servo fields 552. The number of data sectors 554 between any adjacent pair of servo fields can vary based on a number of factors such as radius, disc size, number of servo fields, data capacity of the data sectors, etc. In some cases, split sectors may be used so that a first portion of a sector appears before a given servo field 552 and a remaining second portion of the sector appears after the given servo field 552. Each data sector 554 may have a predetermined fixed size and may store a selected amount of user data, such as 512 bytes, etc.

It will be appreciated that the various embodiments disclosed herein allow the placement of data tracks such as 550 at locations significantly farther from the center of the discs as compared to media formed using standard sized substrates. For example, in a 3½ inch form factor HDD an outermost data track 550 arranged as shown in FIG. 21 can be at an average radius greater than 47.5 mm from the center of rotation. In a 2½ inch form factor HDD, an outermost track such as 550 can be at an average radius greater than 32.5 mm from the center of rotation. Such tracks can represent the most valuable real estate on the discs due to the greater linear velocity (and hence, higher potential frequency) as well as proximity to load/unload ramps or other structures. Using enlarged substrates thus provide enhanced performance capabilities in this area as well.

It will now be appreciated that the various embodiments of the present disclosure can provide a number of benefits. By enlarging the size of a substrate for a magnetic recording disc from the standard sizes of 95 mm and 65 mm, enhanced data recording and read characteristics can be achieved over the entirety of the radial distance of a recording area of the discs formed from such substrates. Enhanced performance at the outermost extents of the recording media can be obtained. The use of a derating factor allows for the same, or better, overall data storage capacity to be attained while improving manufacturing yields, process times, etc.

For purposes of the appended claims, a 3½ inch form factor hard disc drive (HDD) will be defined consistent with the foregoing discussion to have length and width dimensions of nominally 146.1 mm by 101 mm and sized such that two 3½ inch form factor HDDs in a side-by-side arrangement have a corresponding footprint of a 5¼ inch form factor HDD. A 2½ inch form factor HDD will be defined consistent with the foregoing discussion to have length and width dimensions of nominally 101 mm by 73 mm and sized such that two 2½ inch form factor HDDs in a side-by-side arrangement have a corresponding footprint of a 3½ inch form factor HDD.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A data storage device comprising:
   a housing member for a 3½ inch form factor storage device;
   a data recording disc supported by the housing member and having an overall diameter of nominally from 96.6 mm to 100.8 millimeters, mm; and
   a data read/write transducer configured to be controllably advanced across a recording surface of the data recording disc and to record data to data tracks adjacent an outermost perimeter of the data recording disc beyond a nominal radius of 47.5 mm from a center of rotation of the data recording disc.

2. The data storage device of claim 1, wherein the housing member is a base deck of the 3½ inch form factor storage device having nominal dimensions of 146.1 mm by 101 mm.

3. The data storage device of claim 1, wherein the overall diameter of the data recording disc is nominally from 96.9 mm to 100.8 mm.

4. The data storage device of claim 1, wherein the overall diameter of the data recording disc is nominally 97 mm, 98 mm, 99 mm or 100 mm.

5. The data storage device of claim 1, further comprising storage device electronics supported on an exterior printed circuit board (PCB) affixed to the housing member opposite the data recording disc, the storage device electronics in electrical communication with the data read/write transducer.

6. The data storage device of claim 1, further comprising a spindle motor supported by the housing member, the spindle motor supporting the data recording disc and configured to rotate the data recording disc at a selected rotational velocity.

7. The data storage device of claim 1, further comprising a load/unload ramp structure supported by the housing member at a position adjacent the outermost perimeter of the data storage device to facilitate contacting support of the transducer away from the data recording surface responsive to transitioning of the data storage device to a deactivated state.

8. The data storage device of claim 1, further comprising a rotary actuator which supports the transducer and pivots about a pivot point adjacent the outermost perimeter of the data storage device responsive to an application of current to a voice coil motor (VCM).

9. The data storage device of claim 1, wherein the housing member is characterized as a base deck, the data storage device further comprising a top cover which mates with the base deck to form a sealed enclosure in which the data recording disc and the data read/write transducer are disposed.

10. A data storage device comprising:
    a housing member for a 2½ inch form factor storage device;
    a data recording disc supported by the housing member and having an overall diameter of nominally from 66.6 mm to 71.8 millimeters, mm; and
    a data read/write transducer configured to be controllably advanced across a recording surface of the data recording disc and to record data to data tracks adjacent an outermost perimeter of the data recording disc beyond a nominal radius of 32.5 mm from a center of rotation of the data recording disc.

11. The data storage device of claim 10, wherein the housing member is a base deck of the 2½ inch form factor storage device having nominal length and width dimensions of 101 mm by 73 mm.

12. The data storage device of claim 10, wherein the overall diameter of the data recording disc is nominally from 66.9 mm to 71.8 mm.

13. The data storage device of claim 10, wherein the overall diameter of the data recording disc is nominally 67 mm, 68 mm, 69 mm or 70 mm.

14. The data storage device of claim 10, further comprising storage device electronics supported on an exterior printed circuit board (PCB) affixed to the housing member opposite the data recording disc, the storage device electronics in electrical communication with the data read/write transducer.

15. The data storage device of claim 10, further comprising a spindle motor supported by the housing member, the spindle motor supporting the data recording disc and configured to rotate the data recording disc at a selected rotational velocity.

16. The data storage device of claim 10, further comprising a load/unload ramp structure supported by the housing member at a position adjacent the outermost perimeter of the data storage device to facilitate contacting support of the transducer away from the data recording surface responsive to transitioning of the data storage device to a deactivated state.

17. The data storage device of claim 10, further comprising a rotary actuator which supports the transducer and pivots about a pivot point adjacent the outermost perimeter of the data storage device responsive to an application of current to a voice coil motor (VCM).

18. The data storage device of claim 10, wherein the housing member is characterized as a base deck, the data storage device further comprising a top cover which mates with the base deck to form a sealed enclosure in which the data recording disc and the data read/write transducer are disposed.

19. A data storage device comprising:
    a base deck for a 2½ inch form factor storage device, the base deck having nominal length and width dimensions of about 101 mm by 73 mm;
    a disc stack assembly supported by the base deck comprising a rotatable spindle motor hub which contactingly supports a plurality of axially aligned data recording discs each having an overall diameter of nominally from 66.6 mm to 71.8 millimeters, mm; and
    a rotary actuator which supports a corresponding array of data read/write transducers each configured to be controllably advanced across a respective recording surface of the data recording discs and to record data to data tracks adjacent an outermost perimeter of the data recording discs beyond a nominal radius of 32.5 mm from a center of rotation of the disc stack assembly.

20. The data storage device of claim 19, wherein at least one recording surface of the data recording discs extends at a nominal radius of at least 33.3 mm from the center of rotation of the disc stack assembly.

\* \* \* \* \*